US006556309B1

United States Patent
Campbell et al.

(10) Patent No.: US 6,556,309 B1
(45) Date of Patent: Apr. 29, 2003

(54) CONSERVATION OF PRINTER MEMORY ON THE COMPOSITION PAGE IN RESPONSE TO PAGE PIPE FEEDBACK

(75) Inventors: Russell Campbell, Boise, ID (US); Timothy P. Blair, Boise, ID (US); David L. Lanning, Eagle, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/141,790

(22) Filed: Aug. 28, 1998

(51) Int. Cl.[7] .............................................. G06F 15/00
(52) U.S. Cl. ..................... 358/1.16; 358/1.17; 358/1.14
(58) Field of Search ................................ 358/1.1, 1.12, 358/1.13, 1.14, 1.15, 1.16, 1.17, 1.5, 1.9, 1.8

(56) References Cited

U.S. PATENT DOCUMENTS

| | | | | |
|---|---|---|---|---|
| 5,063,499 A | * | 11/1991 | Garber | 395/500 |
| 5,129,049 A | | 7/1992 | Cuzzo et al. | 358/1.14 |
| 5,479,587 A | | 12/1995 | Campbell et al. | 358/1.17 |
| 5,483,622 A | | 1/1996 | Zimmerman et al. | 358/1.15 |
| 5,796,930 A | * | 8/1998 | Gauthier et al. | 358/1.17 |
| 5,797,689 A | * | 8/1998 | Oyama et al. | 400/74 |
| 6,052,200 A | | 4/2000 | Mitani | |
| 6,092,171 A | * | 7/2000 | Relph | 711/203 |
| 6,124,942 A | * | 9/2000 | Ichinowatari | 358/1.17 |

OTHER PUBLICATIONS

U.S. Pending patent application Ser. No.: 08/918,835; filed: Aug. 26, 1997; Inventor(s): Timothy P. Blair; Title: Reducing Memory Fragmentation By Coalescing And Redistributing Previously Distributed Page Strips; Attorney Docket No.: 10971109–1.

U.S. Pending patent application Ser. No.: 08/958,437; filed: Oct. 27, 1997; Inventor(s): Russell Campbell et al; Title: Memory Partitioning For Multi–Resolution Pauseless Page Printing; Attorney Docket No.: 10971687–1.

U.S. Pending patent application Ser. No.: 09/064,665; filed: Apr. 22, 1998; Inventor(s): Russell Campbell et al Title: Freeing Memory In A Page Printer During Duplex Processing; Attorney Docket No.: 10981036–1.

* cited by examiner

Primary Examiner—Mark Wallerson
(74) Attorney, Agent, or Firm—Lane R. Simmons

(57) ABSTRACT

An imaging device and method provide memory management tasks on data of a page being composed in response to feedback generated by memory management tasks that are performed on pages in the page pipe that are waiting to be imaged. The feedback is throttled relative to memory management tasks that occur in the pipe. Advantageously, the memory management tasks are performed on the page being composed without waiting for an already composed page to finish imaging. Accordingly, page throughput of a multi-page print job is improved. The memory management tasks include compressing, relocating, and/or compressing and relocating data. Page data on which the memory management tasks are performed include raster patches, fonts, patterns, video bands, monster bands and vector bands. Atomic operations and/or a critical section locking mechanism provide collision avoidance as between the memory management tasks performed on data in the pipe and a video imaging task.

27 Claims, 12 Drawing Sheets

CONSERVATION OF PRINTER MEMORY ON THE COMPOSITION PAGE IN RESPONSE TO PAGE PIPE FEEDBACK

RELATED APPLICATIONS

This application includes subject matter related to co-pending application having U.S. Ser. No. 09/141,786, and co-pending application having U.S. Ser. No. 09/141,789, each filed on even date herewith and incorporated by reference herein.

FIELD OF THE INVENTION

This invention relates in general to image forming devices and, more particularly, to page printer memory management.

BACKGROUND OF THE INVENTION

Maximizing print speed is an important goal for any printer. Meeting this goal can be difficult in laser page printers because of resource contention, resource limitation, resource fragmentation, and lack of advance knowledge of job and page content.

In printers that employ laser engines as the "print mechanism", data must be provided at a speed that is fast enough to keep up with the print action (which can be measured by the rate of movement of the paper past the imaging drum). In such printers, formatting is either performed on the host computer, with large volumes of rasterized image data shipped to the printer at high speed, or on a formatter within the printer itself. Since a conventional laser printer engine operates at a constant speed, if rasterized image data is not available when a previous segment of image data has been imprinted, a "print overrun" or "punt" occurs and the page is not printable. In essence, in order to avoid a punt, the Image Processor that rasterizes the image data "races" the Output Video Task that images the data onto the imaging drum. This is commonly termed "racing the laser".

Several methods have been used in the art to avoid print overruns. First, a full raster bit map of an entire page may be stored in the printer so that the print mechanism always has rasterized data awaiting printing. However, this solution requires large amounts of random access memory (RAM) for each page. A second method for assuring the availability of print data to a laser printer is to construct a display list from the commands describing a page. During formatting, a page description received from a host is converted into a series of simple commands, called display commands, that describe what must be printed. The display commands are parsed and sorted according to their vertical position on the page. The page is then logically divided into sections called bands (or page strips). The sum of the display commands for each band is referred to as the display list for that band. The bands are then individually rendered (i.e., the described objects in the display list for each band are rendered) into a raster bit map and passed to the print engine for printing. This procedure enables lesser amounts of RAM to be used for the print image.

When the display commands are rendered at a fast enough pace, the same memory used to store a first band can be reused for a subsequent band further down the page. For example, in certain prior art printers it is known to employ three raster buffers for storing bands. During page processing, the first buffer is reused for a fourth band on the page, the second is reused for a fifth band, etc. However, under standard (generally maximum) page-per-minute performance, little time is left between finishing printing of a band and when a next band is required to be rasterized from the same print buffer.

Under certain circumstances, "complex" bands will include many display commands and require a longer than normal time for rasterization. Additionally, to rasterize a band (whether "complex" or not), more memory space may be required than is currently available—depending upon several factors associated with the printer, including memory size, memory fragmentation, job to be printed, and other printer system activities. In the case of a complex band, rasterization time may increase to such an extent that the succeeding band can not be delivered on time, thus causing a print overrun to occur. Accordingly, pre-rasterization is commonly performed on a complex band to ensure that the video imaging race with the laser will not cause a print overrun.

Racing the laser requires making a determination regarding how to get the best trade off between printer memory and real time processing requirements. In a properly working printer, a print overrun is avoided because the Image Processor task just manages to win every race with the direct memory access (DMA) video output task. It is undesirable to avoid print overruns by unilaterally pre-rasterizing every video band because (even with compression) that consumes too much precious printer memory for video DMA buffers. As such, one process has been developed to permit minimization of the number of pre-rasterized video buffers and is disclosed in U.S. Pat. No. 5,129,049 to Cuzzo et al., the disclosure of which is incorporated in full herein by reference. This was extended for compression and empirical Image Processor cost measurements in U.S. Pat. No. 5,479,587 to Campbell et al., also incorporated in full herein by reference.

In Campbell et al., in the event of low available memory (i.e., a memory fault) for processing print commands, each band of a page may be reevaluated and passed through several steps in attempt to reduce memory allocation requirements and free up more memory. For example, each band may be rasterized and compressed using one of several compression techniques. After a band is rasterized and compressed, the memory allocation requirement for that band is determined. If the memory allocation requirement is less than the memory allocation requirement of the display list for that same band (relative to a comparison threshold), then the rasterized and compressed version will be used and stored in memory rather than the display list. The rasterized and compressed band is stored in memory by being dissected into fragments (segments) and then linked and distributed into "holes" in the memory. The "holes" are, typically, smaller isolated free areas of memory surrounded by larger unavailable (used) areas. On the other hand, if the rasterized and compressed band's memory allocation requirement is not less than the memory allocation requirement for its display list (per the threshold), then the band may be processed again using a different compression technique. These steps of rasterizing a band, compressing it, comparing the size of the compressed version to the display list, and determining if the memory allocation requirement of the compressed version is less than that of the display list, may be repeated multiple times using differing compression techniques and/or thresholds until the band's allocation requirement is less than that of its display list.

Once all of the bands have been rasterized, compressed, evaluated and distributed (when the threshold was met) then processing of the print commands resumes at the point where the event of low available memory was previously detected (i.e., the point that initiated the reevaluation process for the page). The band that was previously attempting a memory allocation (but detected the low available memory event) should now have a better chance of being able to satisfy its memory allocation.

Distinguishing now from Campbell et al., U.S. Pat. No. 5,483,622 (Zimmerman et al.) discloses a Page Printer Having Automatic Font Compression and is also incorporated herein by reference in full. In Zimmerman et al., in the event of low available memory for processing print commands, alternative steps occur to alleviate the low memory error including: (i) compressing raster graphic images, and (ii) if no raster graphic images are present or if compression of the raster graphic images does not remove the low memory error, then compressing font characters. Additionally, a large size font whose size exceeds a threshold may automatically be compressed, regardless of a memory low/out signal being present.

Although these cited memory processing techniques often enable a memory allocation request to be satisfied, fragmentation of the memory may not be reduced. For example, fragmentation may not be reduced while composing the current page because each band on the page is processed independently of all other bands. Namely, if a first band is rasterized, distributed and stored, and then some memory surrounding a distributed segment of that first band is subsequently deallocated, then the first band ends up actually causing fragmentation in the memory since it remains there even after its surrounding areas were deallocated. This scenario may occur, for example, if a segment of the first band was stored in a hole that was created by a second band's display list, and then the second band's display list was removed from around the first band in order to render the second band's rasterized and compressed band. Disadvantageously, if the memory becomes too fragmented (i.e., too many "holes" exist throughout the memory address space) such that other memory allocation requests cannot be satisfied that require contiguous allocations of memory, then overall page processing is crippled and a memory out error may result. U.S. Pat. No. 6,130,759 further describes the dissecting of bands into holes in memory and further describes a method of reducing fragmentation and is incorporated herein by reference in full.

Finally, it should be noted here that none of these image processing systems teaches a "page pipe" in connection with the memory management schemes employed. A page pipe is the sum of all the composed pages in a memory that are waiting to be processed by the print engine (i.e., waiting to be video imaged). Typically, these prior systems embody barely sufficient amounts of memory to operate and, thus, are unable to sustain a true page pipe. Specifically, such printers employ sufficient memory for composing a current page just fast enough to race the laser and, generally, for simultaneously video imaging an already composed page. But, they do not have sufficient memory and memory management resources for holding and managing pages that are already composed and just waiting to be video imaged. In other words, no page pipe is taught by these systems. Thus, conventionally, anytime a memory resource contention occurs (such as a memory allocation fault) for the current page being composed, the prior systems simply wait for the single, already composed page that is being video imaged to complete its imaging and release its memory resources.

However, more recent larger and faster printing systems do employ page pipes to keep the printers operating at full speed. Such page pipes may vary in size to hold one or more pages that are already composed and are waiting to be video imaged. In these page pipe systems, the probability of memory fragmentation and memory resource contention is increased over non page pipe systems. Consequently, if the processing of print commands (i.e., composing the current page) cannot be satisfied, in some cases the printing process has been known to undesirably "pause" when there are multiple pages in the pipe. When a pause occurs, it has been recognized that the printer (the composing task) is typically waiting for the allocation in memory of a band that is required for punt (print overrun) avoidance. The allocation may not occur for a number of reasons, including memory fragmentation, resource contention, and low free memory availability. Often, however, after one or more of the pages that are in the page pipe are printed (video imaged or "flushed" from the pipe), sufficient memory becomes available so that the band allocation may generally be satisfied and, thus, conclude the "pause". Notably, during any given "pause", potential processing bandwidth is lost because, conventionally, further page composition tasks are suspended until sufficient resources become available.

This "pausing" (or holding of further page composition tasks) that occurs during a multi-page print job is not only undesirably but also frustrating to a user that expects a certain page-per-minute output as described by the page printer's specifications.

Accordingly, an object of the present invention is to improve consistency of page throughput in a printer through improved memory management techniques.

SUMMARY OF THE INVENTION

According to principles of the present invention in a preferred embodiment, an imaging device and method provide memory management tasks on data of a page being composed in response to feedback generated by memory management tasks that are performed on pages in the page pipe that are waiting to be imaged. The feedback is throttled relative to memory management tasks that occur in the pipe. Advantageously, the memory management tasks are performed on the page being composed without waiting for an already composed page to finish imaging. Accordingly, page throughput of a multi-page print job is improved.

In preferred embodiments, the memory management tasks include compressing, relocating, and/or compressing and relocating data on the page being composed. Page data on which the memory management tasks are performed include raster patches, fonts, patterns, video bands, monster bands and vector bands. Atomic operations and/or a critical section locking mechanism provide collision avoidance as between the memory management tasks performed on data in the pipe and a video imaging task.

Other objects, advantages, and capabilities of the present invention will become more apparent as the description proceeds.

DETAILED DESCRIPTION OF THE INVENTION

Figure 1:
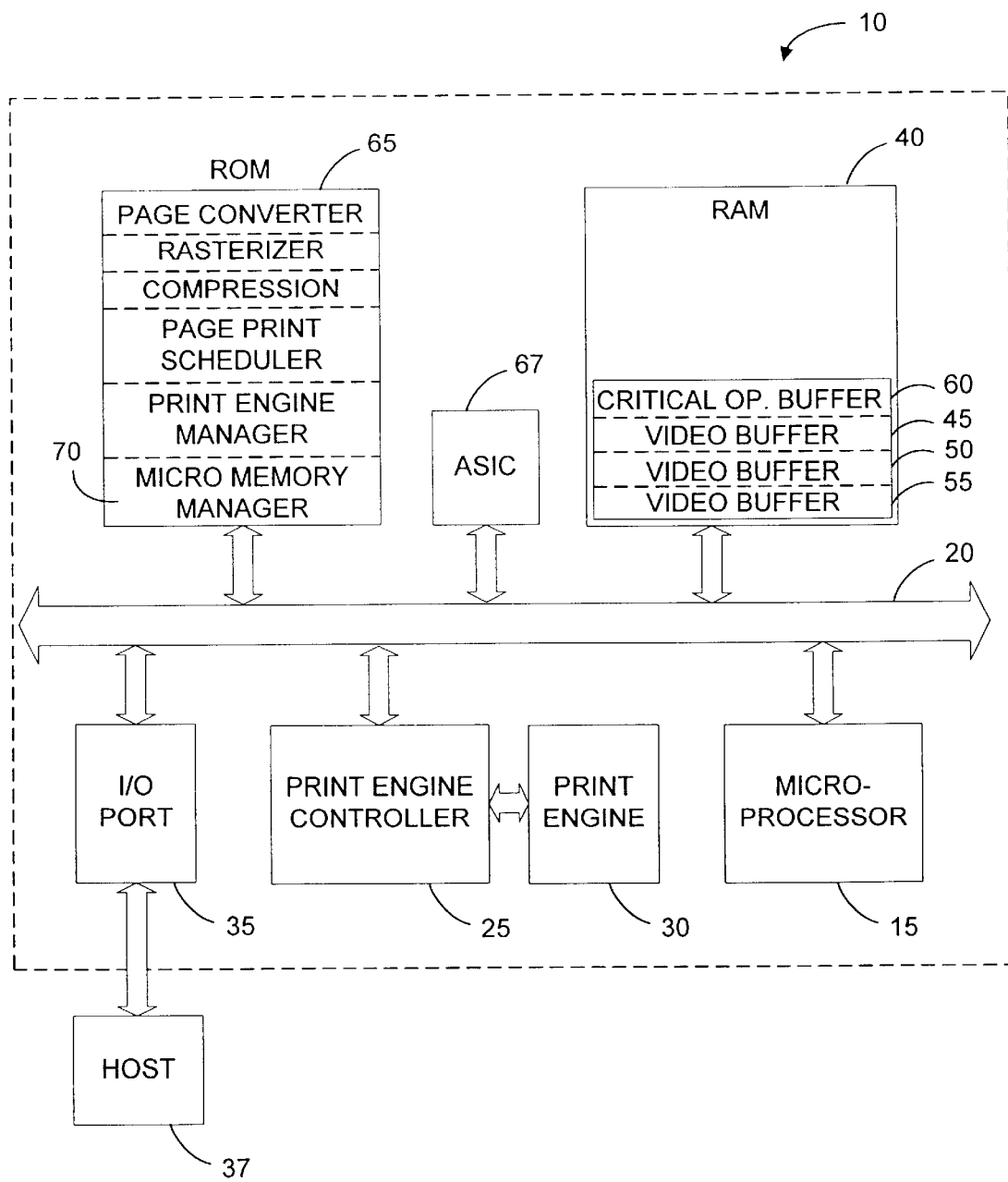
FIG. 1 is a block diagram of a laser printer embodying one embodiment of the present invention system and method for memory management in a multi-page print job.

FIG. 1 is a high level block diagram of a page printer 10 incorporating the present invention apparatus and method for improving memory management and thereby reducing printer pauses during a multi-page print job. Page printer 10 is controlled by a microprocessor 15 which communicates with other elements of the system via bus 20. A print engine controller 25 and associated print engine 30 connect to bus 20 and provide the print output capability for the page printer. Print engine 30 is preferably a laser printer that employs an electrophotographic drum imaging system as well known in the art. However, as will be obvious to those of ordinary skill in the art, the present invention is similarly applicable to other types of printers and/or imaging devices for improving consistency of page throughput, including digital copiers, facsimile devices and the like.

An input/output (I/O) port 35 provides communications between page printer 10 and host computer 37, and receives page descriptions from the host for processing within page printer 10. A dynamic random access memory (RAM) 40 provides a main memory for the page printer. For purposes of discussion herein, RAM 40 is representative of a general purposes memory and/or a cache memory associated with processor 15, both as well known in the art. A first portion of RAM 40 includes three (in this example) pre-allocated (reserved) buffers 45, 50 and 55 (hereinafter 45–55) which are employed during band processing. These buffers may be video buffers (in a preferred embodiment) or some other pre-allocated buffers. During the print process, each pre-allocated video buffer receives a selected band's rasterized image data for storing and passing the same to print engine controller 25 and print engine 30. Only after one of the buffers 45, 50 or 55 becomes available (i.e., the band's rasterized data is transferred/imaged onto the drum), can a next band of rasterized data be inserted. During a multi-page (pipelined) print job, these video buffers are constantly in use and are used only for temporarily storing the rasterized image data prior to being output to the print engine. Although the pipeline of print data may be "flushed" out of the video buffers to free them up for other print processing needs, it is not generally desirable to do so because of the inevitable "pausing" that occurs in the printing process (whether in the middle of a current multi-page print job, or in between print jobs). In this context, "flushing" generally means waiting for sufficient memory 40 to be freed up to satisfy a particular allocation request by the current page being composed, which may mean waiting for a composed page that is currently being video imaged to finish imaging and/or waiting for one or more pages that are composed and waiting in the page pipe to be video imaged so that their allocated memory resources will be freed up.

In a preferred embodiment, a second portion of RAM 40 includes another pre-allocated (reserved) buffer 60. Buffer 60 is a critical operations buffer and is used for storing critical operation data for the express purpose of reducing printing pauses by the print engine which would potentially otherwise occur due to fragmentation of general memory area 40 and the general contention for memory therein during processing of print commands.

Preferably, critical operations buffer 60 is used to store data that requires a contiguous allocation of memory. For example, data stored in critical operations buffer 60 may include, selectively, pre-rasterized data, compressed data, pre-rasterized and compressed data, rendered character bitmaps, scaled raster objects, rotated raster objects, vector path data, or other data used for defragmenting or otherwise managing memory 40. Additionally, the data is stored in buffer 60 only temporarily relative to band data stored and processed in general memory 40. Namely, it is temporary because the buffer is released for further use after completion of the critical operation (i.e., pre-rasterization, compression, etc.), but at least upon the close of a page being printed.

Advantageously, buffer 60 provides a reserved, contiguous area of memory for certain critical operations during page processing without, generally, having to wait for memory to be freed up in general memory 40 and without having to flush out video buffers 45–55 (i.e., without waiting for them to be flushed). The critical operations buffer is further described in U.S. patent application Ser. No. 08/958, 437, incorporated herein by reference in full.

A read only memory (ROM) 65 holds firmware which controls the operation of microprocessor 15 and page printer 10. Although the firmware routines are discussed in reference to being stored in ROM 65, it is understood that their functionality may likewise be implemented in ASIC 67 if so desired. The routines (code procedures) stored in ROM 65 may include the following: a page converter, rasterizer, compression code, page print scheduler and print engine manager. The page converter firmware converts a page description received from the host to a display command list (wherein each display command defines an object to be printed on the page). The rasterizer firmware converts each display command to an appropriate bit map (rasterized band) and distributes the bit map into memory 40. The compression firmware compresses the rasterized bands or other data as necessary. Each of these routines may be conventional in the art.

Importantly, ROM 65 further includes a micro memory manager 70 according to the present invention. Micro memory manager 70 includes memory management task routines that coordinate and govern the memory management issues according to the present invention for improved memory management and savings as will be described more fully herein.

When a page is racing the laser (i.e., all bands are being rasterized for imaging), then the rasterized bands are consecutively stored in one of the pre-allocated buffers 45–55 and subsequently passed to print engine 30 by print engine controller 25, thereby enabling the generation of an image (i.e., text/graphics etc.). The page print scheduler controls the sequencing and transferring of band buffers to print engine controller 25. The print engine manager controls the operation of print engine controller 25 and, in turn, print engine 30 for imaging of the bands to an output page.

The present invention addresses several problems that typically exist with conventional print systems employing page pipes. First, in conventional systems, the page composition task is blocked from further composing the current page when a critical shared resource is unavailable (i.e., a memory allocation fault blocks the composition task). Essentially, this starves the page pipe and causes the printer to "pause". Second, while the composition task waits for a shared resource allocation that cannot be satisfied for the current page, very little useful work is done relative to reducing the pause other than waiting for one or more pages to flush from memory. Clearly, this is a waste of processing bandwidth. Third, in some cases if the composition task is working on data further ahead of the video imaging task than is necessary, such work can do more harm than good. In such cases, memory fragmentation may be increased and thus generate a page pipe pause.

Figure 2:
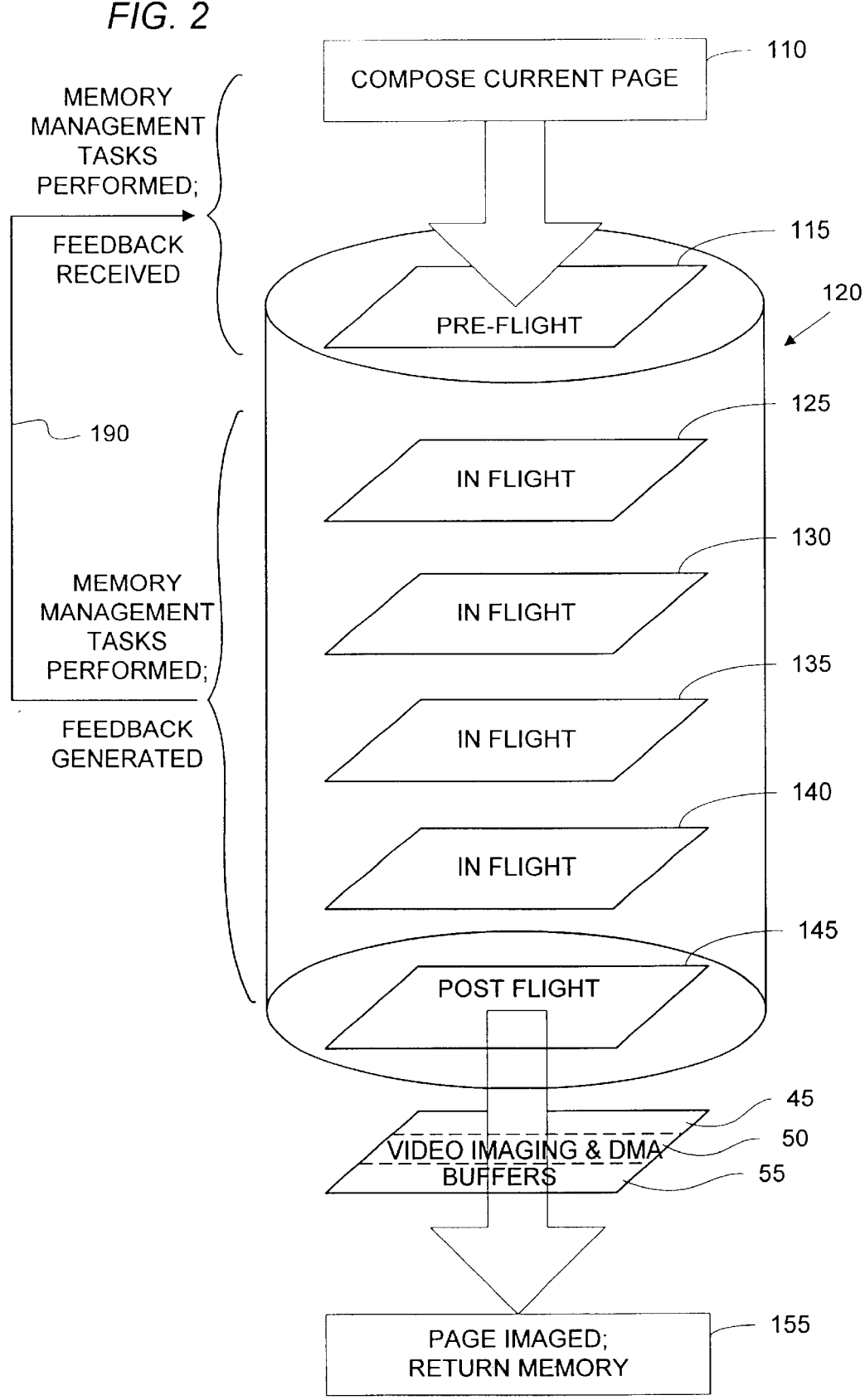
FIG. 2 is a schematic block diagram depicting image processing states relative to a page pipe and as applicable to one embodiment of the present invention.

FIG. 2 is a schematic block diagram depicting image processing states applicable to the present invention and as described in reference to the imaging system of FIG. 1. During image processing, a stream of data is received into memory 40 (FIG. 1) and parsed to compose a current page 110. The "current page" is used to characterize the state of a page that is being composed. Namely, the page has been "opened" or started but no command to "close" the page (such as a PostScript "showpage") has been found by the personality parser (i.e., the printer control language parser).

A "pre-flight" page 115 represents a page in the process of being "closed" because, for example, a "showpage" or equivalent command is being executed by the composition task. In other words, a page in the pre-flight state 115 is one that is being closed by the personality and is just about to be released to an "in-flight" state in the page pipe 120. Note that pages 110 and 115 are really one and the same physical page during image processing but are represented separately to show the time-dependent sequentially separate composition states.

In-flight is a term used to characterize the state of a page that is waiting in page pipe 120 (i.e., in memory 40). A page that is in-flight is "closed", is released from the personality, and is simply waiting for video imaging by print engine controller 25 and print engine 30. In FIG. 2, four pages 125, 130, 135, 140 are composed and waiting in pipe 120 for video imaging. However, these are merely exemplary and it is understood that the page pipe may be configured to hold any number of composed pages depending on specific system 10 configurations (including, for example, the length of the paper path, the use of paper tray options, and how much memory 40 is established for use). In any case, each composed page 125, 130, 135, 140 waits its turn in the FIFO (first in first out) queue of pipe 120 to be video imaged.

Page 145 represents a page that is in a post-flight status, i.e., being transitioned into a video imaging state. Buffers 45, 50 and 55 (see also FIG. 1) depict how the bands of page 145 are being sequentially video imaged by print engine controller 25 and print engine 30. It is especially critical that the data (or bands) that make up page 145 remain readily available in memory 40 for complete video imaging. After page 145 is completely video imaged 45–55 (by print engine 30), its previously allocated resources in memory 40 are released 155.

Advantageously, the present invention performs memory management tasks on (i) data that make up the page currently being composed 110, 115, and/or upon (ii) data that make up composed pages 125, 130, 135, 140 that are waiting in pipe 120 to be video imaged, or data that make up a composed page 145 that is being video imaged 145 but has not yet passed to video imaging and DMA buffers 45–55. Importantly, these memory management tasks are performed without waiting for an already composed page 125, 130, 135, 140, 145 to finish imaging. In other words, composition processing bandwidth is used productively rather than wasted. Additionally, memory management tasks performed on pages 125, 130, 135, 140, 145 in pipe 120 are monitored in order to generate feedback 190 to enable further anticipatory or proactive memory management tasks on a page currently being composed 110, 115. Accordingly, page throughput of a multi-page print job is improved.

Figure 3:
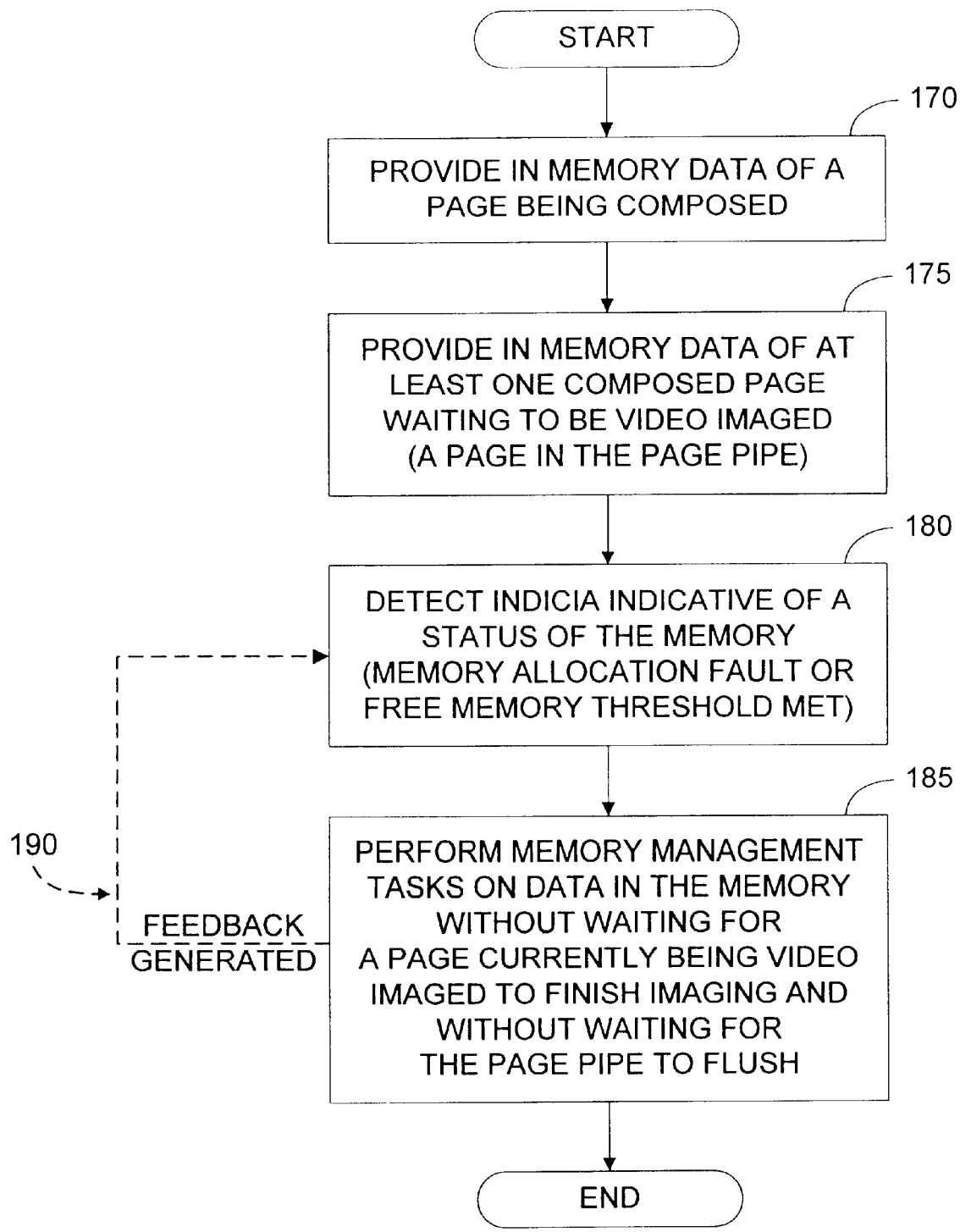
FIG. 3 is a flow chart depicting, generally, one embodiment of the present invention method of image processing in an imaging system having a page pipe.

FIG. 3 is a flow chart depicting, generally, the present invention method of image processing in an imaging system 10 having a page pipe 120. First, 170, 175, data of a current page being composed 110, 115 and data of at least one composed page 125, 130, 135, 140 waiting to be imaged is provided in memory 40 of an imaging system 10. The composed pages 125, 130, 135, 140, 145 are those pages that form the page pipe 120. When a certain status of the memory 40 is detected 180, such as a memory allocation fault or a low free memory threshold being met, then one or more specific memory management tasks are performed 185 on data in the memory 40 without waiting for a page currently being video imaged 145 to finish imaging and without waiting for the page pipe 120 to flush.

The data upon which the memory management tasks are performed includes data of the page being composed 110, 115 and/or data 125, 130, 135, 140, 145 in the pipe 120. The memory management tasks may include compressing the data, relocating the data, compressing and relocating the data, and/or compressing and relocating using a memory fragmentation avoidance technique. When a memory management task is performed on data 125, 130, 135, 140, 145 in the pipe 120, feedback is generated 190 so that further anticipatory memory management tasks may be performed on the current page 110, 115 being composed. The feedback is indicative of a low free memory threshold being met. For example, if it is detected that data in the pipe was compressed, then it is a good indicator that data currently being composed will need compressing in order to avoid a memory allocation fault and maintain page throughput.

Figure 4:
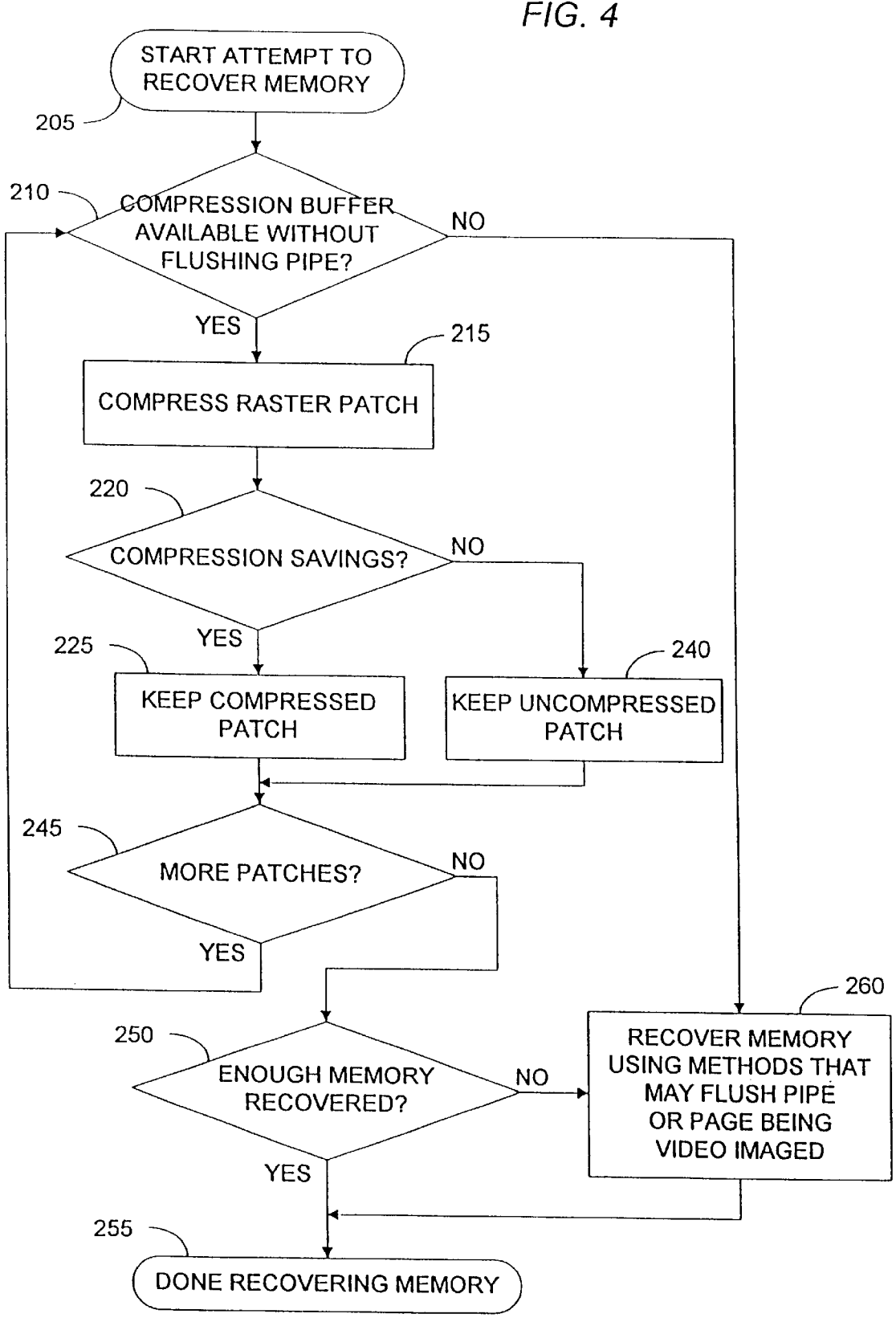
FIG. 4 is a flow chart depicting a compression memory management task performed under principles of the present invention according to one embodiment while the composition task is blocked and waiting for memory to free up.

FIG. 4 is a flow chart depicting a compression memory management task performed while the composition task for the current page 110 is blocked (i.e., due to a memory allocation fault) and waiting for memory 40 to free up, or due to feedback received 190 (FIGS. 2 and 3) that is indicative of a low free memory threshold being met. Preferably, the compression memory management tasks are performed on raster patches (pieces of raster images that are associated with bands) on either the current page 110, pre-flight page 115, or in-flight pages 125, 130, 135, 140, 145. For the page being composed 110 there is a preference for compression of raster patches because as the page is being composed, objects may continue to be added to the bands. As such, if just the raster patches are compressed, they are easily added to the band (i.e., via indirection pointers) as composition of the page continues. However, if an entire band is compressed rather than just its raster patches, the entire band may need to be uncompressed and recompressed when further objects are added during composition. Alternatively, the memory management tasks are performed on fonts, patterns, the entire video band, a monster band (large, whole raster band that is not dissected or dispersed in memory), a vector band (a band wherein the display list commands constitute a majority of the memory used for the band), or any other object. However, for simplicity of discussion, FIG. 4 depicts the case of memory management of raster patches.

So, if memory recovery is initiated 205, and if a compression buffer 60 is available 210 without flushing the pipe 120, then any raster patches that are available to be compressed are compressed 215. A patch is available for compression if the complexities associated with that band indicate that the patches can be compressed (and decompressed) without causing a punt when the page is subsequently video imaged. This is done by a check of complexities that are bound to the band. Importantly, this compression task is performed without waiting for the page currently being video imaged 145 to flush or for any other page in the pipe 120 to flush. If there is a compression savings for the patch 220, then the compressed patch is kept 225. On the other hand, if there is not a compression savings 220, then the original uncompressed patch is kept 240. Alternatively (not shown), further compression techniques may be applied until a compression savings for the patch is found.

If there are more patches to be compressed 245 (either on the current band or on the entire page, depending on implementation), then the compression memory management process is repeated 210, 215, 220, 225, 240 to compress those patches as necessary.

Once the patches are processed and sufficient memory is recovered 250 then the recovery cycle is complete 255. Preferably, in the context of a blocked composition page 110, the threshold for determining whether sufficient memory is recovered 250 is larger than the amount actually needed (relative to the initial memory allocation fault that initiated the compression memory management task). This provides a "buffer" of available memory so that further composing of the current page may continue without immediately encountering another memory allocation block.

In the event sufficient compression buffers are not available 210 without flushing the pipe, or if enough memory is not recovered 250 (in the context of a blocked composition page), then memory is recovered 260 using conventional methods that may flush the pipe 120 or page 145 currently being video imaged.

Figure 5:
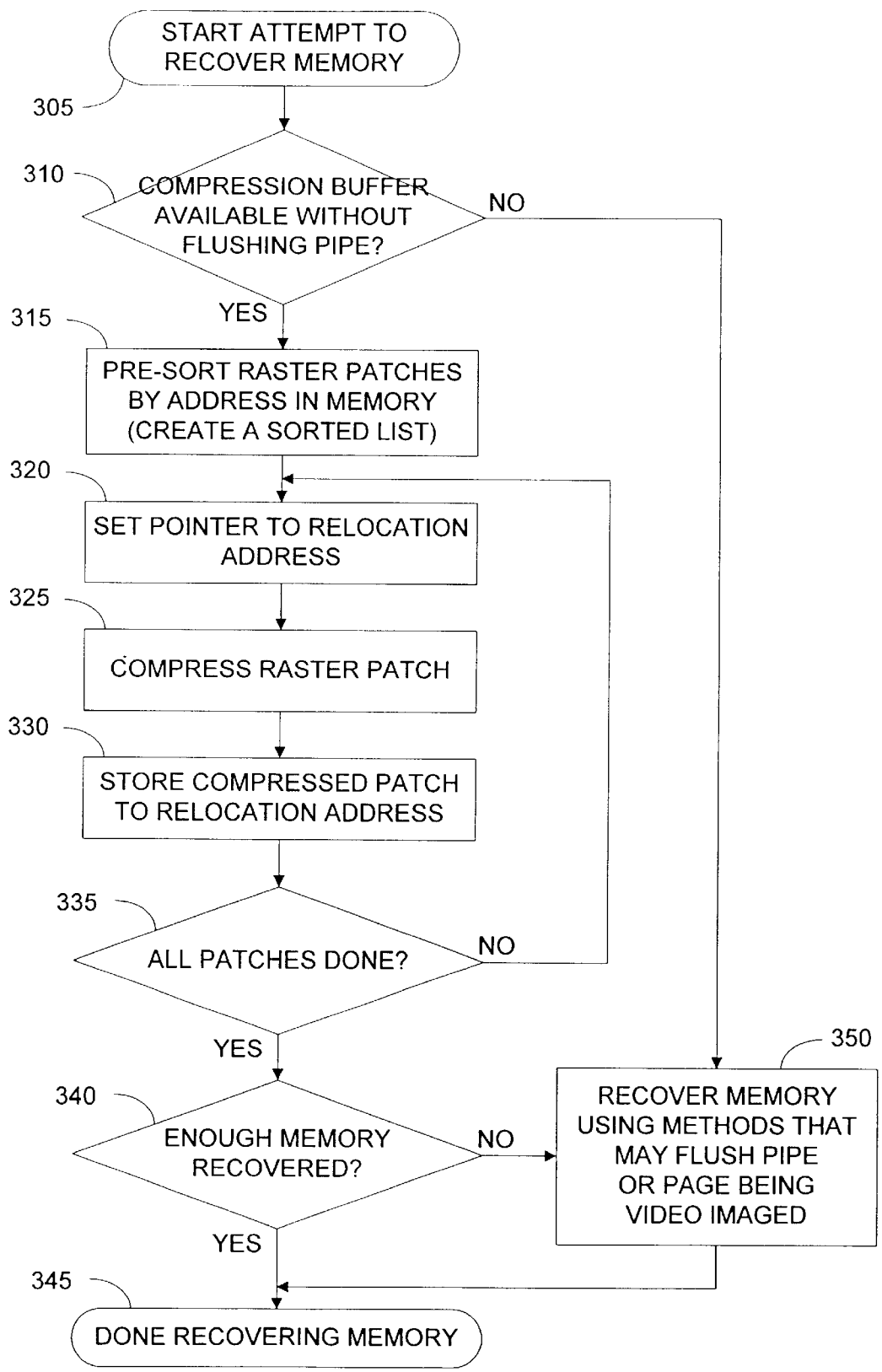
FIG. 5 is a flow chart depicting a data compression and relocation memory management task evoked while the composition task is blocked according to one embodiment.

Referring now to FIG. 5, this flow chart depicts a data compression and relocation memory management task method that is (or may be) evoked in the event the composition task is blocked or in the event feedback is received 190 (FIGS. 2 and 3) that is indicative of a low free memory threshold being met. In this example, the data compression and relocation is performed such that memory fragmentation is reduced. In other words, the method of FIG. 5 is a proactive fragmentation avoidance memory management scheme. Again, for simplicity of discussion purposes, FIG. 5 depicts the case of memory management of raster patches.

Figure 6A:
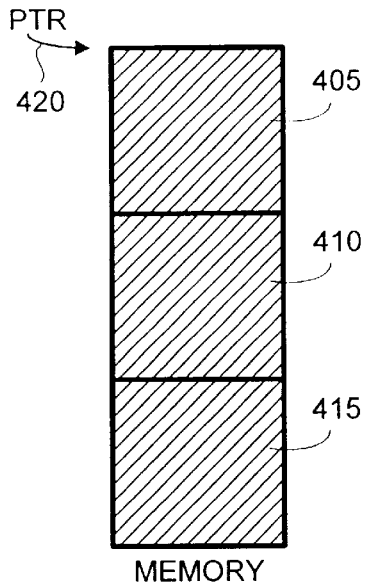
FIGS. 6A–E are block diagrams representing raster patches in memory at different points in time and that are compressed and relocated using a fragmentation avoidance technique according to one embodiment.

Upon an attempt to recover memory 305, if compression buffers 60 are available 310 without having to flush the pipe 120, then the raster patches in memory 40 are pre-sorted 315 according to address location. In other words, a list is created that identifies all of the raster patches in an order sorted by address. A pointer is then set 320 to the first relocation address. FIG. 6A is a block diagram representing such a created list and identifies (as an example) three raster patches 405, 410, 415 in memory 40 sorted by address. In this first pass example, the first relocation address is the starting address of the first raster patch 405 and is identified by pointer 420.

Figure 6B:
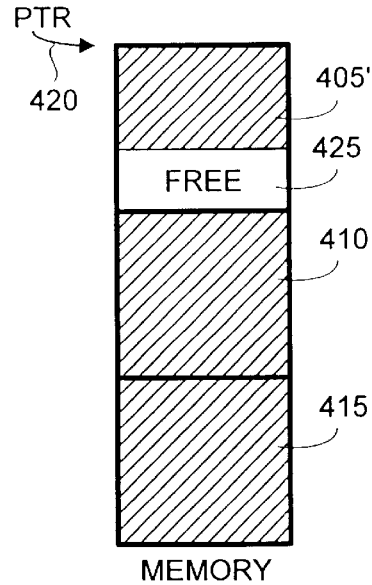

Continuing on, the "current" raster patch is then compressed 325 using compression buffer 60. In this first pass example, the current raster patch is first raster patch 405. Upon compression, the patch is then stored 330 back into memory 40 at the relocation address identified by pointer 420. FIG. 6B depicts this configuration with compressed patch 405' stored at pointer 420. FIG. 6B also depicts how free space 425 is now created adjacent to patch 405'. Free space 425 is that space created from the difference of the size of original first patch 405 with the size of new compressed patch 405'.

Figure 6C:
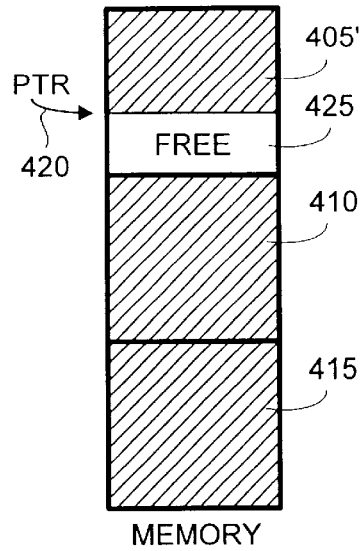
Figure 6D:
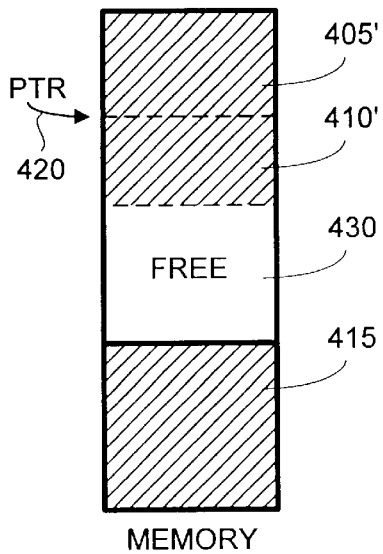

If all patches are not done 335, the compression/relocation cycle is repeated. Namely, the pointer is set 320 to the new relocation address to identify where the next compressed patch should be stored. FIG. 6C depicts pointer 420 set now to the new relocation address (i.e., the end of compressed first patch 405'). Subsequently, again, the next patch is compressed 325 and stored to the new relocation address 330. FIG. 6D depicts this step and how second patch 410 has been compressed into patch 410' and stored at the new relocation address identified by pointer 420. New free space 430 is also shown.

Figure 6E:
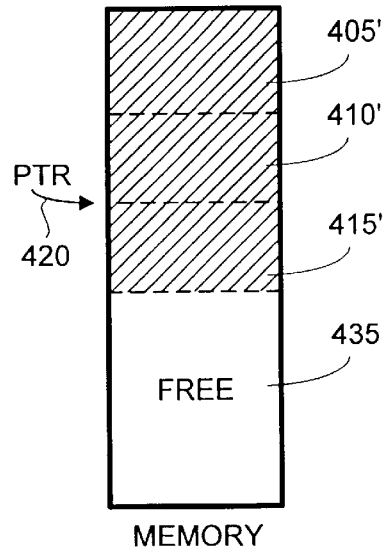

Again, since not all patches are done being processed 335, the compression/relocation cycle is repeated 320, 325, 330. FIG. 6E depicts this repeated step and shows how pointer 420 has been relocated to the end of compressed patch 410' and how third patch 415 has been compressed into patch 415' and stored at the new relocation address identified by pointer 420. New free space 435 is also shown and clearly depicts how memory fragmentation has been avoided and reduced during the compression and relocation of original patches 405, 410, and 415. Namely, one larger free space 435 remains now in memory 40 rather than multiple smaller fragmented free spaces. As such, memory allocation requests should have a better chance of being satisfied during the composing of a current page 110 (FIG. 2).

Once the patches are processed 335 and sufficient memory is recovered 340 then the recovery cycle is complete 345. In the event sufficient compression buffers are not available 310 without flushing the pipe, or if enough memory is not recovered 340 (in the context of a blocked composition page), then memory is recovered 350 using conventional methods that may flush the pipe 120 or page currently being video imaged 145.

Figure 7:
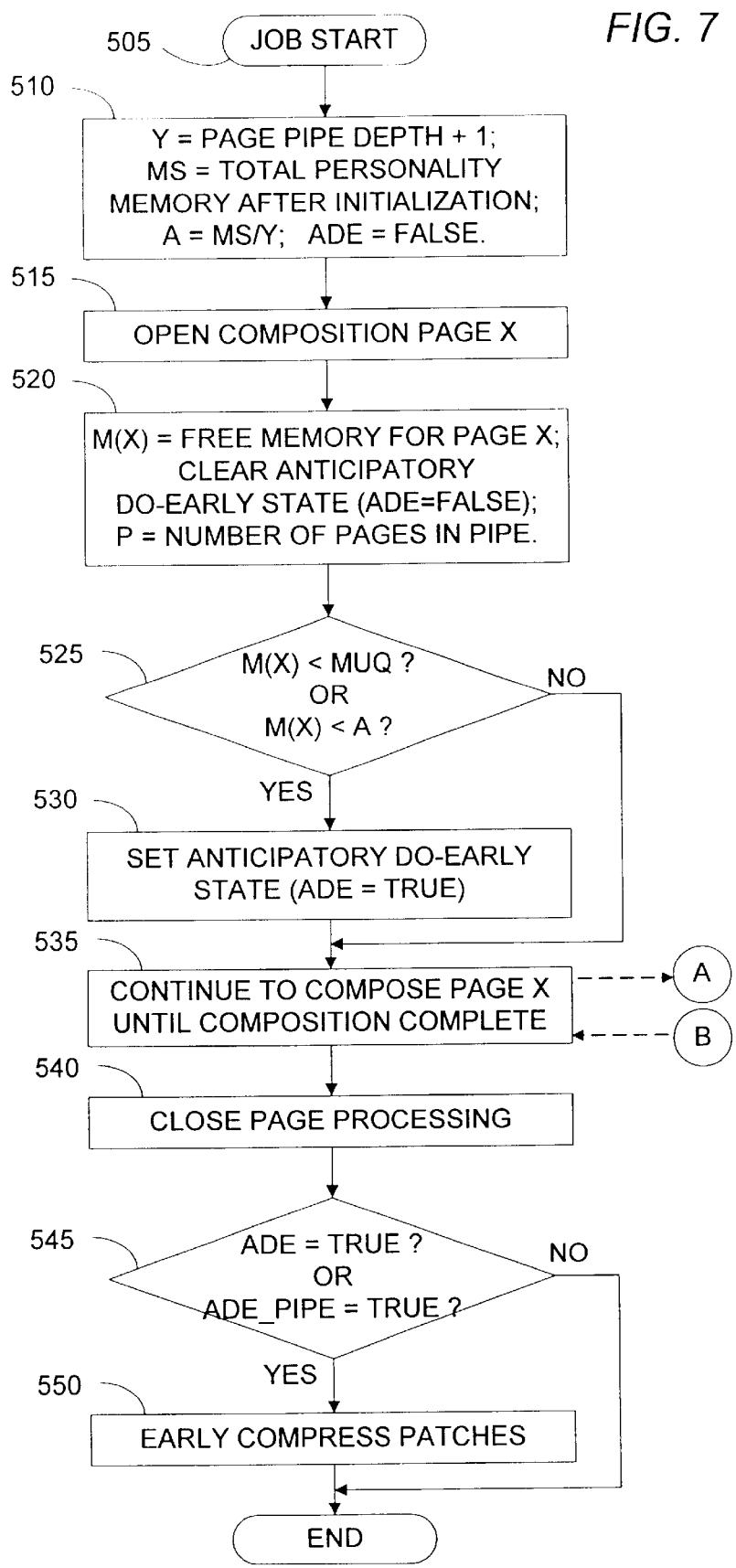
FIGS. 7–8 are linking flow charts depicting a preferred method for anticipatory compression of raster patches.
Figure 8:
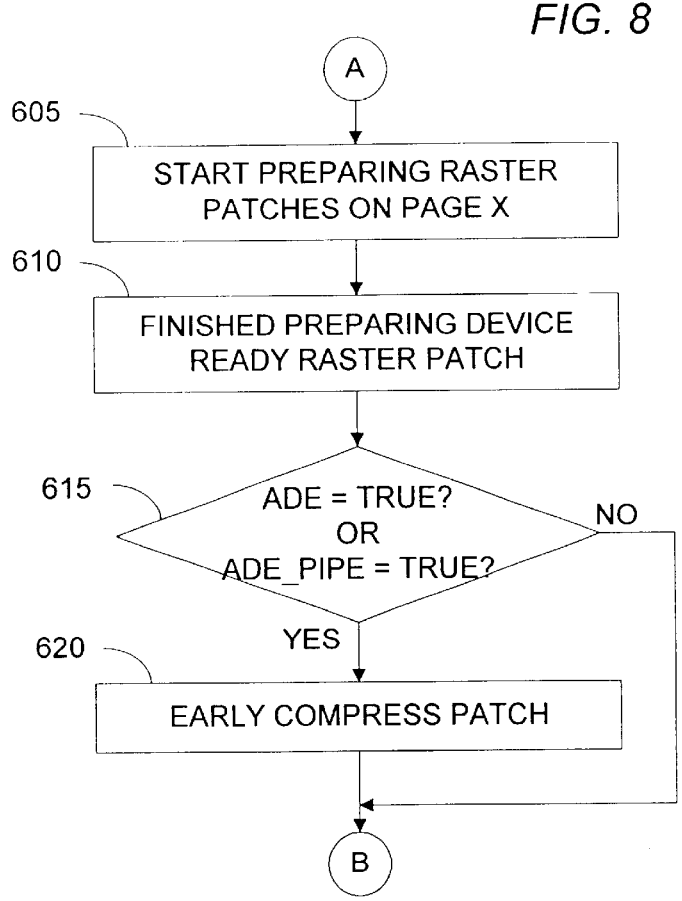

Referring now to FIG. 7 and FIG. 8, these flow charts depict a preferred method for anticipatory compression of raster patches according to the present invention. In this context, "anticipatory" means "prior to detecting a memory fault condition during page composition", and may occur in response to a general low memory threshold detected or a feedback signal generated from a memory management task acting upon a page in the pipe 120. It is understood that compression and decompression reactive tasks are costly and change the complexity of a band. Thus, the method of FIGS. 7 and 8 attempts to balance compression/decompression costs with the potential benefits of anticipatory compression where it is deemed a reasonable chance exists to enhance the overall page print rate (i.e., reduce pausing). Again, raster patches will be used for simplicity of discussion purposes although the method is equally applicable to fonts, patterns, entire video bands, monster bands, vector bands or other objects. Additionally, although only anticipatory "compression" is described and referenced in FIGS. 7 and 8, the anticipatory principles are similarly applicable to relocation of data.

First, a few definitions are helpful as follows:

Y=Number of pages in the physical page pipe 120 (FIG. 2), plus one. The "plus one" is to account for the page being composed 110. As such, the metric for utilization of anticipatory compression is normalized by the number of physical pages in the page pipe plus the page currently being composed. In reference back to the page pipe 120 of FIG. 2, Y would be set to six (five pages 125, 130, 135, 140, 145 in the pipe, plus one being composed 110).

P=Actual current number of pages in the page pipe.

MS=Total memory at job start after power-on.

A=MS/Y=Average memory per physical pipe page.

M=Amount of free memory at beginning of current page.

MUQ=Memory Utilization Quotient is a threshold amount of memory that is adjusted from empirical data. MUQ is empirically determined relative to any and/or all of the other values, including Y, P, MS, A and M.

A couple of generalized thoughts are also helpful here. First, when the free memory M at page open exceeds the Memory Utilization Quotient MUQ, anticipatory compression of patches is avoided. This tends to avoid compression on the first page, minimizing the first-page-out time. Second, when free memory M is less than MUQ or less than A, then anticipatory compression is performed (i.e., a flag or state is set for accomplishing anticipatory compression). This is an indication that there may not be enough memory to compose the current page and enough future pages to fill the page pipe.

So, referring now to FIG. 7, upon the start of a print job 505 certain variables are set 510, including Y, MS, A (as previously described), and the anticipatory do-early flag ADE is set to FALSE (cleared). When page X (the current page) is opened for composition purposes 515, further variables are set 520, including P, M(X) which stores the free memory that is available for page X, and the anticipatory do-early flag ADE is again set to FALSE (cleared).

Now, 525, if M(X) is less than MUQ (the memory utilization quotient), or if M(X) is less than A (the average memory per physical pipe page), then it is deemed that anticipatory do-early compression should occur (in this example, to raster patches). Accordingly, the anticipatory do-early (ADE) state variable is set to TRUE 530. On the other hand, if M(X) is not less than MUQ or A 525, then ADE is not set TRUE. In either case, subsequently, composition of the current page X continues 535 until it is completed and closed 540. During composition 535 of page X, certain tasks are detailed in FIG. 8 as referenced by the dashed directional arrows and the "circle A" and "circle B" and will be discussed later herein.

If ADE=TRUE, or if the anticipatory do-early-because-of-the-pipe-flag ADE_PIPE=TRUE 545, then any remaining (i.e., not already compressed) raster patches are compressed 550 to avoid future memory allocation faults. ADE_PIPE is an anticipatory do-early flag that is set by feedback generated 190 (FIGS. 2 and 3) due to memory management tasks performed on pages in the pipe 120. ADE_PIPE and the feedback generated will be discussed more fully subsequently herein.

FIG. 8 is a flow chart depicting another processing area in which anticipatory compression of data (i.e., raster patches) occurs. Specifically, FIG. 8 represents further detail of block 535 of FIG. 7, and is shown to represent some of the processing that may occur during composing of page X.

During composition of the current page X, raster patches are prepared 605. This includes identifying, gathering and preparing the patches in memory 40 to be associated with appropriate bands on the page for subsequent rendering. Once one or more of the patches are prepared 610 (i.e., they are device ready for rendering), the ADE flag and ADE_PIPE flags are checked. If either is set (TRUE), then those one or more patches are early compressed 620. If neither is set, then page composition continues (535, FIG. 7).

In review now, it should be noted that in Campbell et al. (U.S. Pat. No. 5,479,587), the compression of raster patches on the page being composed was done only after encountering a memory fault and only after the page pipe had been completely flushed, but not in anticipation of a potential memory fault or low memory condition and without waiting for a page to finish imaging or the pipe to flush as described by the present invention.

Figure 9:
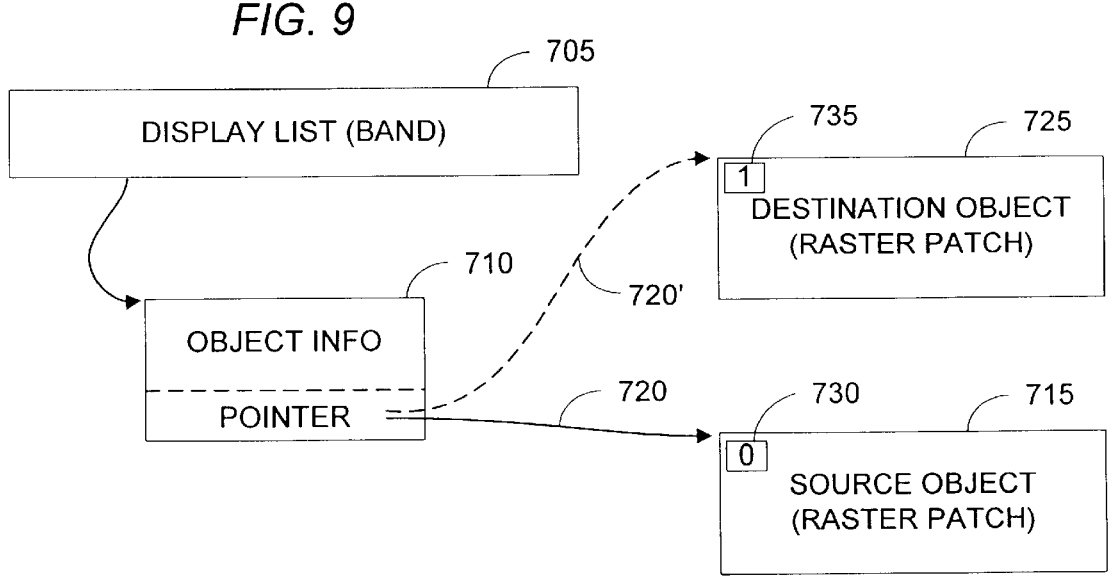
FIG. 9 is a block diagram depicting a preferred mechanism for collision avoidance between in-flight compression (and/or relocation) and video imaging.

Referring now to FIG. 9, a block diagram depicts a preferred mechanism for collision avoidance between in-flight compression (and/or relocation) and video imaging. It is necessary to control these memory management tasks so as to maximize their effectiveness without adversely affecting data that must be read by the video imaging task. The video imaging task must have immediate access to bands when it is ready for them or punting could result.

One preferred mechanism of accomplishing collision avoidance is with "separate buffers" as shown in FIG. 9. Display list (band) 705 is part of a composed page and is in-flight (i.e., in pipe 120) waiting to be video imaged. Band 705 may hold several objects to be rendered. In the drawing, band 705 references at least one information buffer 710 which holds information about object (raster patch) 715. Buffer 710 references patch 715 using indirection pointer 720. Utilizing the memory management principles of the present invention, patch 715 is to be relocated (and/or compressed) into new separate destination buffer 725, but must be done without interfering with the video task manager that may soon be (or may already be) rendering band 705 and patch 715 (or the information associated with information buffer 710). In this context, the destination memory buffer 725 (into which the copied/relocated and/or compressed data 715 is placed) is totally disjoint from the source memory buffer 715 (which holds the original data).

To accomplish the relocation/compression without collision with the video task, patch 715 is first copied to destination 725. Then, importantly, after the data copy/relocation occurs, the indirection pointer 720 that points to the source data 715 is updated to point 720' to the new destination data 725 as an atomic operation (i.e., a non-interruptible processor instruction), or as a set of pseudo atomic (i.e., locked) instructions. As such, if the video imaging task gets control before the pointer switch occurs, the video task uses the old buffer of data 715 which remains valid. Otherwise, when the video task gets control after the pointer switch, it uses the new buffer of data 725. This mechanism requires that the video image task run (or render) to completion and at a high priority on a memory block 715 or 725 once it has control of that block.

In further reference to FIG. 9, if relocation and compression is to occur for a patch, then the compression state is recorded and bound with the object itself. For example, if source patch 715 is not compressed, then that status is described by a "zero" bit 730. If destination patch 725 is compressed, then that status is described by a "one" bit 735. As such, when the patch is finally accessed by the video imaging task, the compressed or non compressed state will be known within the singular atomic operation of reading the patch data because it is bound with the patch data itself rather than information buffer 710.

Figure 10A:
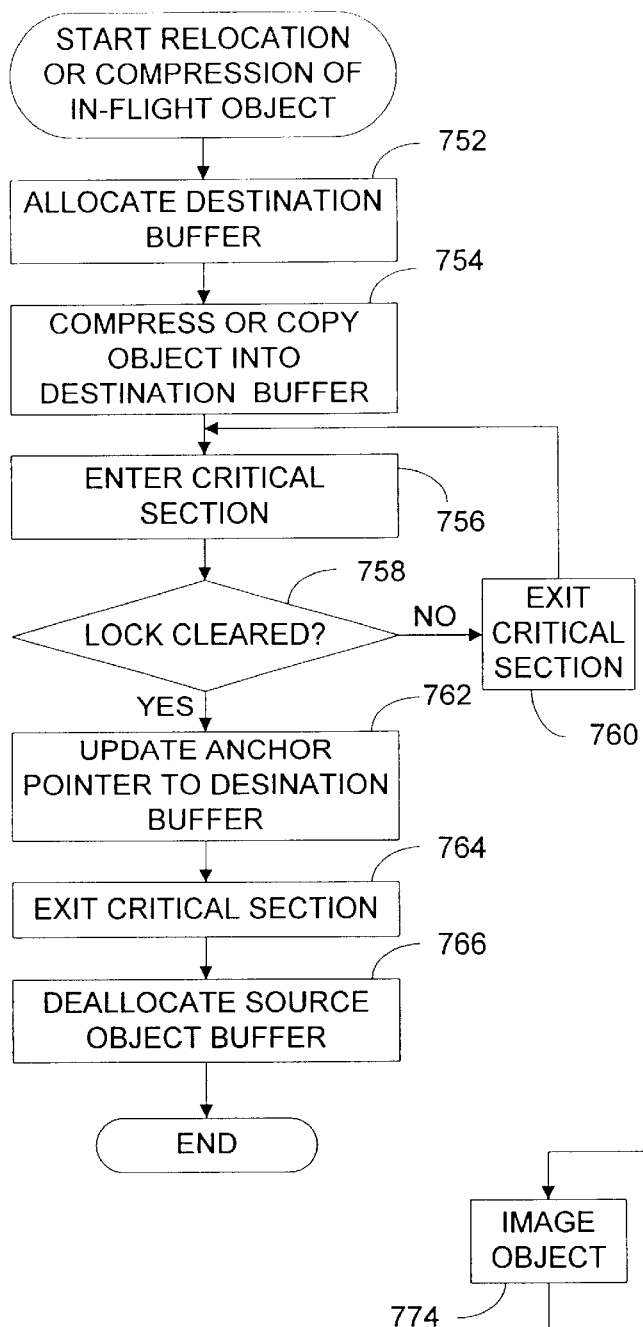
FIGS. 10A–10B are flow charts depicting an alternate embodiment for collision avoidance between the video imaging task and memory management operations on in-flight bands.
Figure 10B:
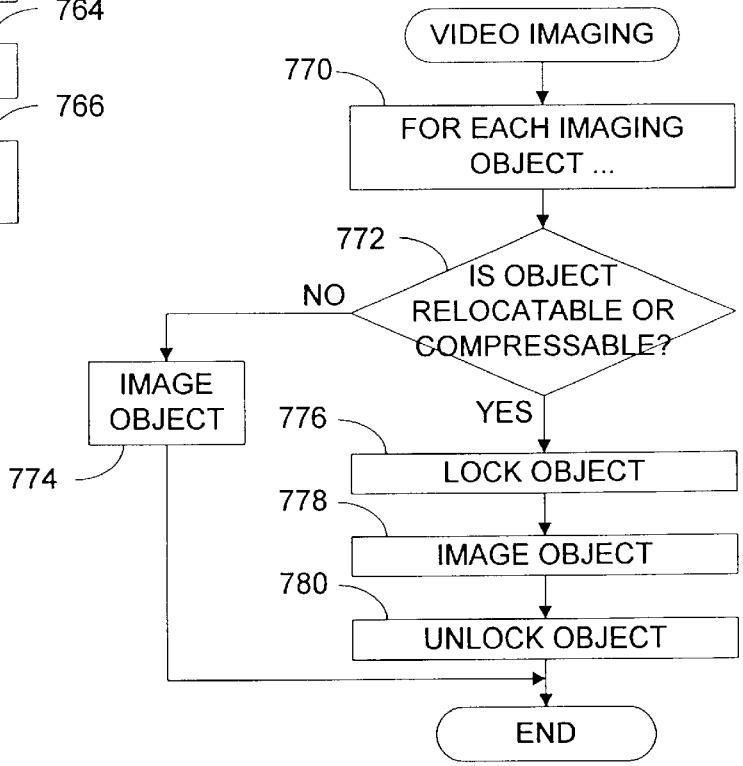

FIGS. 10A and 10B are flow charts depicting an alternate embodiment for collision avoidance between the video imaging task and memory management operations on in-flight bands. FIG. 10A depicts the steps for the memory management task operation, and FIG. 10B depicts the correlative steps for the video imaging task operation. First, in reference to FIG. 10A, after a separate (disjoint) destination memory buffer is allocated 752, the original source object (i.e., raster patch) is copied (or compressed) into the destination buffer 754. Next, a critical section of the method (or executable code) is entered 756. Conventional semaphore technology is suitable for enabling the critical section such that it is an atomic operation. If the lock for the object is not cleared 758 (i.e., the object is locked), the critical section is exited 760 and we simply wait or loop until the lock is cleared 756, 758. If the lock for the object is cleared 758 (i.e., the object is not locked), then the anchor or indirection pointer identifying the source object is updated 762 to point to the destination copy. At this point, the critical section is exited 764 and the task manager, when it gets control of the object, will access the relocated object via the reset anchor pointer. The source buffer is now deallocated 766 for other use.

As an alternative to using separate buffers in reference to FIG. 10A, if memory is really scarce, overlapping buffers may be used. This requires that the copy from source to destination occur within the critical section and within the imaging time/cost allotted for the band.

In reference now to the method of collision avoidance for the video task manager as shown in FIG. 10B, for each imaging object encountered 770, the first step is to determine whether that object is relocatable or compressable 772. This is determined by information bound to that object. If the object is not relocatable or compressable, it is simply imaged 774 without concern for any conflict. On the other hand, if the object is relocatable or compressable 772, then the object is locked 776. Once locked, it is then imaged 778 and subsequently unlocked 780.

Figure 11:
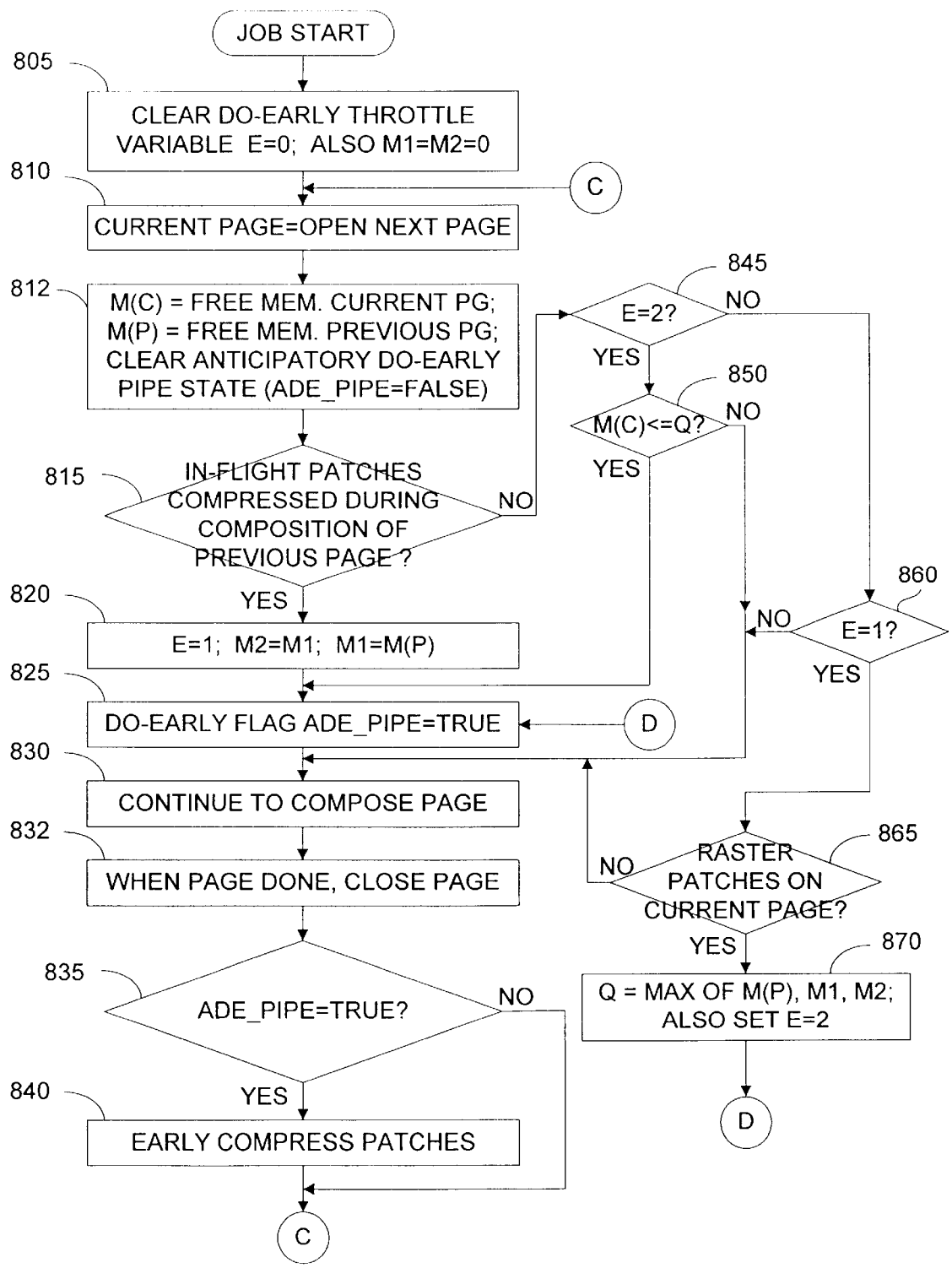
FIG. 11 is a flow chart depicting a preferred method for feedback throttling early (anticipatory) raster patch compression.

FIG. 11 is a flow chart depicting a preferred method for feedback throttling early (anticipatory) raster patch compression (see also FIGS. 2 and 3, 190). Again, although only compression is described in reference to FIG. 11, the principles are similarly applicable to throttling other early memory management tasks (i.e., relocation). Additionally, working with raster patches here is merely exemplary as the method is similarly applicable to other data (i.e., fonts, patterns, bands, monster bands or vector bands) of pages being composed or in the pipe. Thus, overall, feedback throttling refers to controlling how much or how often band data is anticipatorily relocated and/or compressed in response to similar memory management tasks that occur to in-flight bands.

The principal "feedback" mechanism for conventional image processing operations is simply to wait for the printer memory to be freed by printing (flushing) pages being imaged and/or that are in the pipe. However, since the composition task is stopped while these are flushed, an undesirable pause occurs in the print output. In contrast, the present invention "feedback" mechanism proactively enables anticipatory memory management of bands without waiting for the page being imaged or pages in the pipe to finish imaging.

In general, the feedback throttling method of the present invention includes detecting when memory management operations occur on in-flight (or post-flight) data in page pipe 120 (FIG. 2) and, when detected, performing early similar operations on data of the page being composed. For example, if raster patch compression occurred on a page in-flight, then raster patches will be early compressed on the page currently being composed. Additionally, the memory management operations that occur in the pipe are monitored over several pages to establish a free memory threshold for providing some hysteresis to the system (i.e., for "throttling" when to do early compression on the current page) and to inhibit unstable oscillations between early and non-early compressions of raster patches. For example, if raster patches are compressed on in-flight data, then at least the next two pages composed will have patches early compressed.

So, referring again now to FIG. 11, upon the start of a print job a do-early "throttle" variable E is set (cleared) to zero 805, and variables M1 and M2 are set to zero. Subsequently, upon a next page being opened for composition, that page is assigned to be the "current" page 810. Then, certain controlling variables are set 812. Namely, M(C) stores the free memory associated with the current page, M(P) stores the free memory that was associated with the immediately previous page (that was previously composed and now sits in the pipe), and the anticipatory do-early pipe flag ADE_PIPE is set (cleared) to FALSE.

Next, if it is detected 815 that one or more in-flight patches were compressed during the composition of the previous page, then 820 the do-early throttle variable E is set to one, M2 is set to M1, and M1 is set to M(P). Additionally, anticipatory do-early flag ADE_PIPE is set to TRUE 825 to flag the fact that early raster patch compression should occur on the current page being composed. Composition of the current page then continues 830 (see also FIG. 8) until completed.

When the current page is fully composed and closed 832, if ADE_PIPE is TRUE 835, then any remaining raster patches on the current page are early compressed 840 (i.e., patches that have not already been compressed are now compressed). This "early" compression of patches occurs on the current page due to the feedback (ADE_PIPE) received 190 (FIGS. 2 and 3) from the pipe 120 (FIG. 2) that indicates compression occurred on pages in-flight during composition of the previous page. This early compression of data on the current page is throttled up or forced to occur in order to avoid a potential memory allocation fault or low free memory threshold being met.

If it is detected 815 that in-flight patches were not compressed during the composition of the previous page, then the do-early throttle variable E is checked 845. If E does not equal the value "two" 845, but E is equal to the value "one" 860, and there are raster patches on the current page 865, then Q is set to the maximum value of M(P), M1 and M2. Q represents a threshold for continuing further early compression 850 even if no in-fight patches were compressed during composition of the previous two pages 815, 845. Alternatively, Q can be set to the minimum value of M(P), M1 and M2 to enable fewer early compressions after previous in-flight compressions have ceased. When the do-early throttle E is equal to the value "two" 845, it indicates that no in-flight compression occurred during the last two pages composed. If so, and if M(C) is greater than Q, 850, then the ADE_PIPE flag is kept FALSE (not set TRUE) and composition of the current page continues 830 normally. In other words, early compression of data on the current page is throttled down because it is no longer needed.

Figure 12:
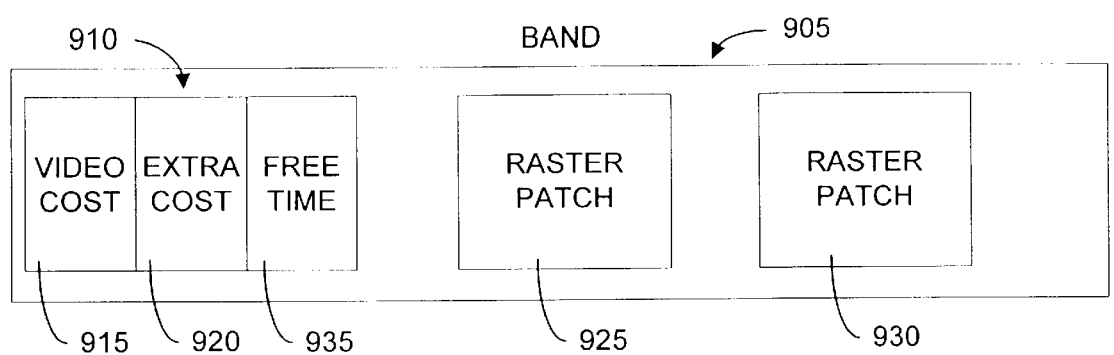
FIG. 12 is a block diagram depicting a preferred embodiment of an in-flight band having complexity data elements bound with the band for enabling in-flight memory management.

Referring now to FIG. 12, a block diagram depicts a preferred embodiment of a band 905 in pipe 120 having complexity data elements 910 bound with the band for enabling in-flight or post-flight memory management under principles of the present invention. Complexity data elements 910 are descriptive of a complexity cost for video imaging band 905. The accumulation of complexity as stored in elements 910 is performed while the display list (band) 905 is being built (i.e., during page composition). Complexity data elements 910 are calculated and bound to the band 905 so that they will be available while the band is traveling through the page pipe 120.

Referring to complexity data elements 910, a first "video cost" element 915 includes a value indicative of a cost (in reference to time) for video imaging band 905 as it currently exists (i.e., in a race against the laser). An "extra cost" element 920 includes a value indicative of an incremental cost (again, in a reference to time) for decompressing raster patches 925, 930 that are bound to the band 905 (usually by a linking/redirection pointer, not depicted, but see FIG. 9). The incremental decompression cost 920 is, generally, a worst case estimate given the compression method and speed of the decompressor available. Cost estimations are empirical based relative to parameters such as band width multipliers, height multipliers, number of bits-per-area multipliers, etc., as is conventional in the art.

A third "free time" element 935 includes a value indicative of how much free time exists for imaging the band. The free time is simply a difference between the cost 915 and an imaging cost threshold (i.e., the maximum allowable time available for video imaging the band before a punt would occur). Importantly, free time element 935 enables a band to quickly determine whether sufficient video imaging time exists for accomplishing the memory management associated with the extra cost element 920 simply by comparing the two element values. Additionally, free time element 935 enables bands to reference each other and "borrow" video imaging time if appropriate. For example, if a first band has a free time of one second, and an adjacent second band has a free time of zero seconds, then the second band may "borrow" one second of free time from the first band. The second band may need this extra "borrowed" second to enable it to compress/decompress its raster patches to save further memory, whereas if it could not borrow the time, the compression/decompression could not occur (without punting) and the memory could not be saved. The first band doesn't need its one second of free time and, thus, can let another band borrow it.

How far away a band can reach to borrow from depends on how many video imaging buffers are used. In the example of FIG. 1, since three video buffers are used 45, 50, 55, a band can borrow up to two bands away. Obviously, the more video buffers are available, the further a band may reach for borrowing purposes. When a band borrows free time, its own cost element 915 is incremented proportionately. On the other hand, for the band from which the free time is borrowed, its free time element is decremented proportionately.

All in all, complexity data elements 910 allow for memory management tasks to be performed on a band 905 (or its objects) when the band is in the pipe without having to concern for whether a punt will occur if the memory management is performed and without having to recalculate a total imaging cost threshold for the band and other bands on the page. Although a preferred embodiment includes each of these elements 910, the use of subsets of these elements or of different information elements are similarly applicable.

Figure 13:
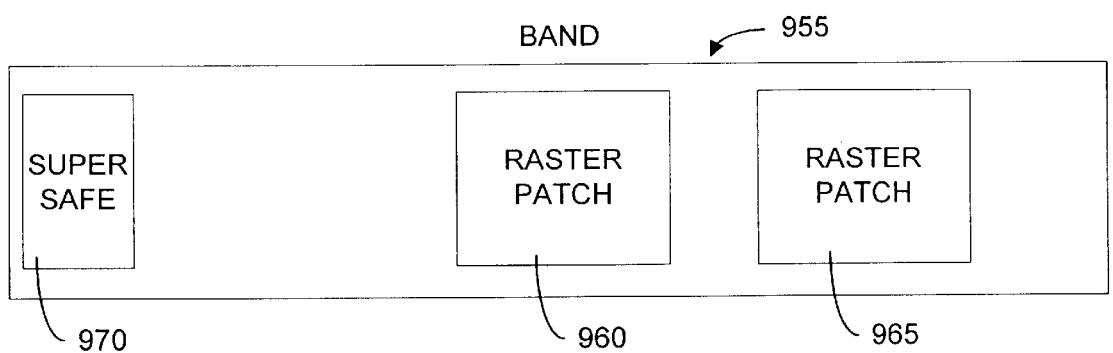
FIG. 13 depicts an alternate and simplified embodiment of an in-flight band having only a single complexity data element bound with the band for enabling in-flight memory management.

FIG. 13 depicts an alternate and simplified embodiment of a band 955 in pipe 120 and having raster patches 960, 965 and only a single complexity data element 970 bound with the band for enabling in-flight or post-flight memory management under principles of the present invention. The single complexity data element 970 is, preferably, a single bit that indicates whether the band is "super-safe" or not for compression/decompression of its patches. As the band is built during page composition, the accumulation of complexity is calculated and then a determination of whether the band is super-safe or not is made. The band is marked super-safe 970 if the complexity calculations determine that the patches can be compressed/decompressed and subsequently video imaged without any concern for causing a punt while the band is in pipe 120. In other words, the "super-safe" designation is bound to the band when no band pre-rasterization is required to avoid punting, but patch compression saves memory and the resulting band complexity would be less than or equal to the imaging cost threshold. Finally, again, it should be noted here that the principles of FIG. 12 and FIG. 13 are similarly applicable to fonts, patterns, bands, monster bands, vector bands and/or other objects.

Figure 14:
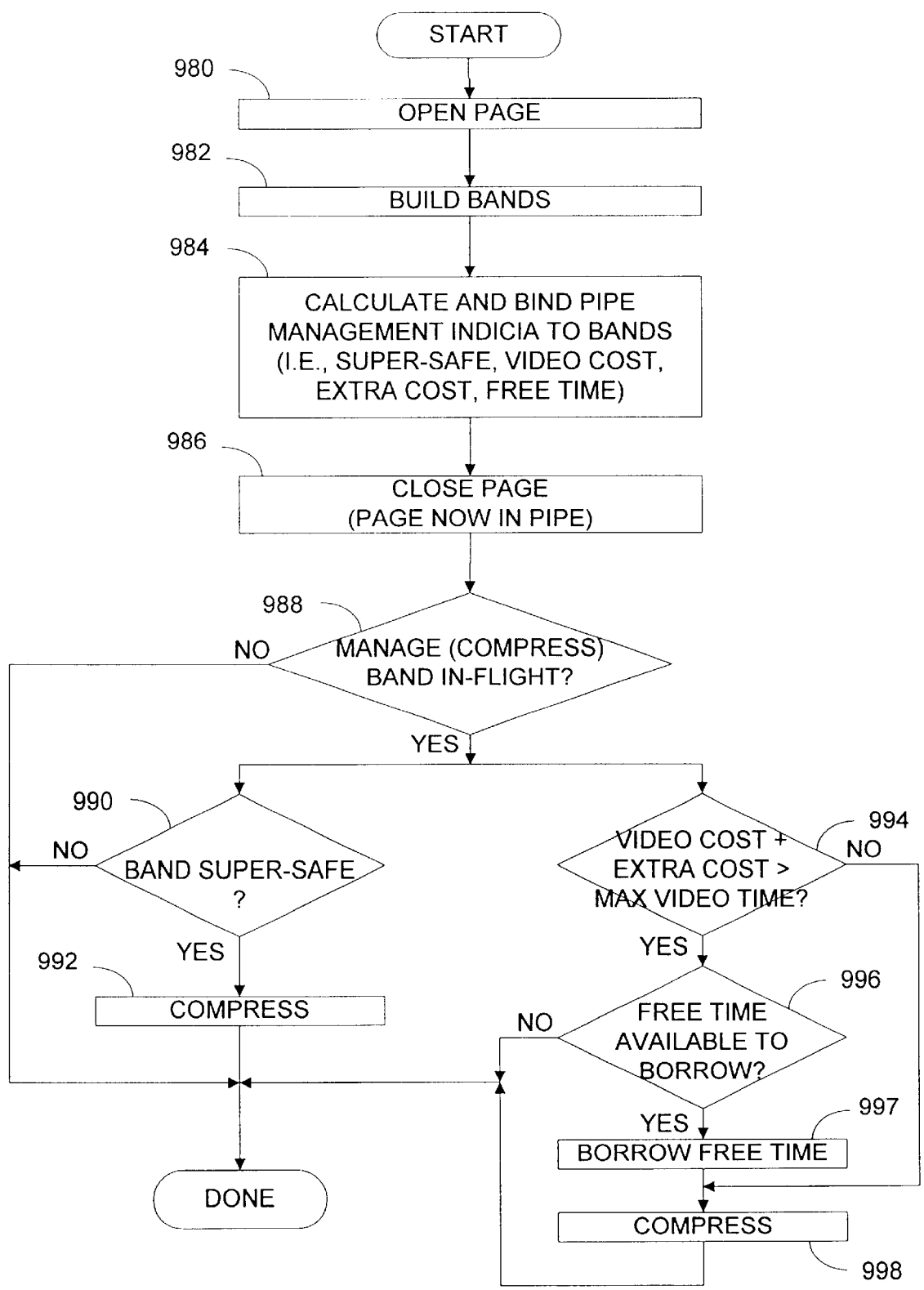
FIG. 14 is a flow chart depicting a method of utilizing complexity data elements that are bound to bands for in-flight management of the bands.

FIG. 14 is a flow chart depicting a preferred method of utilizing complexity data elements 910, 970 (FIGS. 12 and 13) that are bound to bands for in-flight or post-flight management of the bands. Once a page is opened for processing 980, the bands are built 982 as previously discussed herein. As each band is built, a video imaging time cost 915 is accumulated for each band. Additionally, upon completion of the band build, an extra time cost 920 is calculated that is an estimate of how much more time would be required to video image the band if the raster patches associated with that band were to be compressed (using the given compression scheme for the system) and then subsequently decompressed upon video imaging.

If the "super-safe" method of in-the-pipe management is used, then upon completion of the band being built, the accumulated video time is compared to the imaging cost threshold (maximum allowable time available for video imaging the band). If the difference is greater than the calculated extra time cost, then the band is marked as "super-safe" 984 (see also 970, FIG. 13).

On the other hand, if more flexibility is required for in-the-pipe management, then the accumulated video cost 915 and the extra cost 920 is bound to the band 984. Additionally, the free time 935 is bound to the band 984.

Next, the page is closed 986 and its status is now deemed in-the-pipe (in-flight) while waiting for video imaging (FIG. 2). However, importantly, the complexity criteria (i.e., super-safe status, or video cost and extra cost and free time data) remains bound with the bands. If no in-pipe management of the bands is needed 988 (i.e., for improved memory management as previously discussed), then we are done and the bands and page are simply video imaged at the appropriate later time.

If management of the in-the-pipe bands is needed, and if the band is marked "super-safe" 990, it is compressed 992 and can then be subsequently decompressed and video imaged without concern for causing a punt because of its super-safe status. If the band holds the cost criteria 910, and the video cost 915 plus the extra cost 920 is not greater than the imaging cost threshold 994 (or, if the extra cost 920 is less than the free time 935), then the band is compressed 998 and can then be subsequently decompressed and video imaged at the appropriate later time. If the band holds the cost criteria 910, and the video cost 915 plus the extra cost 920 is greater than the imaging cost threshold 994 (or, if the video cost 915 plus the extra cost 920 is greater than the free time 935), then the band may borrow free time from another band 996, 997 and only then is it compressed 998. If free time is not available from any band within reach 996, then no compression occurs.

In summary, the present invention provides tools for enhanced memory management for improved page throughput in an imaging device such as a laser printer. Furthermore, it will be obvious to one of ordinary skill in the art that the present invention is easily implemented utilizing any of a variety of components and tools existing in the art. Moreover, while the present invention has been described by reference to specific embodiments, it will be apparent that other alternative embodiments and methods of implementation or modification may be employed without departing from the true spirit and scope of the invention.

What is claimed is:

1. A method of image processing, comprising:
   (a) providing in a memory: (i) data of a page being composed for imaging, and (ii) data of at least one composed page waiting to be imaged;
   (b) detecting indicia indicative of a memory management task performed on data of the at least one composed page waiting to be imaged to reduce storage inefficiencies in the memory while the at least one composed page is waiting to be imaged; and,
   (c) in response to detecting the indicia, manipulating in the memory the data of the page being composed to reduce storage inefficiencies in the memory.

2. The method of claim 1 wherein the memory is associated with an imaging device including a printer, copier, or facsimile device.

3. The method of claim 1 wherein the data of the at least one composed page in the memory on which the memory management task is performed includes a raster patch, font, pattern, video band, monster band or vector band.

4. The method of claim 1 wherein the memory management task performed on the data of the at least one composed page waiting to be imaged is performed by using an atomic operation for collision avoidance with a video imaging task.

5. The method of claim 1 wherein the memory management task performed on the data of the at least one composed page waiting to be imaged is performed by using a critical section locking mechanism for collision avoidance with a video imaging task.

6. The method of claim 1 wherein the memory management task includes compressing the data.

7. The method of claim 1 wherein the memory management task includes relocating the data.

8. The method of claim 1 wherein the memory management task includes compressing and relocating the data.

9. The method of claim 8 further including compressing and relocating the data using a memory fragmentation avoidance technique.

10. The method of claim 1 further including, in response to detecting the indicia, performing a memory management task on data of at least a next page being composed.

11. The method of claim 10 further including, in response to not detecting any further indicia and in response to detecting a threshold being met, discontinuing the performing of the memory management task on data of one of the at least a next page being composed.

12. The method of claim 1 wherein the memory management task is performed on data of the page being composed without waiting for any composed page to finish imaging.

13. A computer-readable medium having computer-executable instructions for performing steps including:
   (a) providing in a memory: (i) data of a page being composed for imaging, and (ii) data of at least one composed page waiting to be imaged;
   (b) detecting indicia indicative of a memory management task performed on data of the at least one composed page waiting to be imaged to reduce storage inefficiencies in the memory while the at least one composed page is waiting to be imaged; and,
   (c) in response to detecting the indicia, manipulating in the memory the data of the page being composed to reduce storage inefficiencies in the memory.

14. An image processing apparatus, comprising:
   (a) an imaging engine operatively connected to a memory, the memory including: (i) data of a page being composed for imaging, and (ii) data of at least one composed page waiting to be imaged;
   (b) means for detecting indicia indicative of a memory management task performed on data of the at least one composed page waiting to be imaged to reduce storage inefficiencies in the memory while the at least one composed page is waiting to be imaged; and,
   (c) means for manipulating in the memory the data of the page being composed for imaging to reduce storage inefficiencies in the memory in response to detecting the indicia.

15. The apparatus of claim 14 wherein the memory is associated with an imaging device including a printer, copier, or facsimile device.

16. The apparatus of claim 14 wherein the data of the at least one composed page in the memory on which the memory management task is performed includes a raster patch, font, pattern, video band, monster band or vector band.

17. The apparatus of claim 14 further including means for performing the memory management task on the data of the at least one composed page waiting to be imaged, including means for enabling an atomic operation for collision avoidance with a video imaging task.

18. The apparatus of claim 14 further including means for performing the memory management task on the data of the at least one composed page waiting to be imaged, including a critical section locking mechanism for collision avoidance with a video imaging task.

19. The apparatus of claim 14 wherein the memory management task includes compressing the data.

20. The apparatus of claim 14 wherein the memory management task includes relocating the data.

21. The apparatus of claim 14 wherein the memory management task includes compressing and relocating the data.

22. The apparatus of claim 21 wherein the memory management task further includes compressing and relocating the data using a memory fragmentation avoidance technique.

23. The apparatus of claim 14 further including means for performing a memory management task on data of at least a next page being composed without waiting for any composed page to finish imaging.

24. The apparatus of claim 14 wherein the means for performing a memory management task on the data of the page being composed includes means for performing the memory management task without waiting for any composed page to finish imaging.

25. A method comprising:
- (a) storing in a memory first data of at least one composed page waiting to be imaged;
- (b) storing in the memory second data of at least one page to be composed for imaging;
- (c) initiating composing of the second data;
- (d) detecting indicia indicative of a manipulation of the first data in the memory to conserve the memory; and,
- (e) in response to detecting the indicia, manipulating the second data in the memory to conserve the memory and enable a continued composing of the second data.

26. An imaging device, comprising:
- (a) a print engine coupled to a memory, the memory having stored therein (i) data of at least a first composed page waiting to be imaged, and (ii) data of at least a second page not completely composed; and,
- (b) first control logic configured to compose the second page;
- (c) second control logic configured to detect indicia indicative of a manipulation of the first data in the memory to conserve the memory;
- (d) third control logic enabled, in response to detecting the indicia, to manipulate the second data in the memory to conserve the memory and enable a continued composing of the second data.

27. A computer-readable medium having computer-executable instructions for enabling steps including:
- (a) storing in a memory first data of at least one composed page waiting to be imaged;
- (b) storing in the memory second data of at least one page to be composed for imaging;
- (c) initiating composing of the second data;
- (d) detecting indicia indicative of a manipulation of the first data in the memory to conserve the memory; and
- (e) in response to detecting the indicia, manipulating the second data in the memory to conserve the memory and enable a continued composing of the second data.

* * * * *